(12) United States Patent
Flood

(10) Patent No.: US 10,166,654 B2
(45) Date of Patent: Jan. 1, 2019

(54) DENSE PACKING PARTICLE SIZE DISTRIBUTION FOR PDC CUTTERS

(71) Applicant: DIAMOND INNOVATIONS, INC., Worthington, OH (US)

(72) Inventor: Gary M. Flood, Canal Winchester, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 587 days.

(21) Appl. No.: 14/747,093

(22) Filed: Jun. 23, 2015

(65) Prior Publication Data

US 2015/0375366 A1 Dec. 31, 2015

Related U.S. Application Data

(60) Provisional application No. 62/017,303, filed on Jun. 26, 2014.

(51) Int. Cl.
| | |
|---|---|
| *B24D 3/06* | (2006.01) |
| *B24D 3/00* | (2006.01) |
| *B24D 18/00* | (2006.01) |
| *B01J 3/06* | (2006.01) |

(52) U.S. Cl.
CPC .............. *B24D 3/00* (2013.01); *B01J 3/062* (2013.01); *B24D 3/008* (2013.01); *B24D 3/06* (2013.01); *B24D 18/0009* (2013.01); *B01J 2203/062* (2013.01); *B01J 2203/066* (2013.01); *B01J 2203/0645* (2013.01); *B01J 2203/0655* (2013.01); *B01J 2203/0685* (2013.01)

(58) Field of Classification Search
CPC .. B24D 3/00; B24D 3/008; B01J 3/062; B01J 2203/062; B01J 2203/0645; B01J 2203/0655; B01J 2203/066; B01J 2203/06885
See application file for complete search history.

(56) References Cited

U.S. PATENT DOCUMENTS

| | | | |
|---|---|---|---|
| 3,141,746 | A | 7/1964 | Lai |
| 3,609,818 | A | 10/1971 | Wentorf |
| 3,745,623 | A | 7/1973 | Rocco |
| 3,850,591 | A | 11/1974 | Wentorf |
| 4,394,170 | A | 7/1983 | Akira |
| 4,403,015 | A | 9/1983 | Tetsuo |
| 4,794,326 | A | 12/1988 | Friedl |
| 4,954,139 | A | 9/1990 | Cerutti |
| 5,505,748 | A | 4/1996 | Tank et al. |
| 5,766,394 | A | 6/1998 | Anderson et al. |
| 8,069,936 | B2 | 12/2011 | Scott et al. |
| 8,361,429 | B2 | 1/2013 | Vail et al. |
| 2013/0180181 | A1 | 7/2013 | Nixon et al. |

*Primary Examiner* — Pegah Parvini

(57) ABSTRACT

A superabrasive compact and a method of making the superabrasive compact are disclosed. A method of making a superabrasive compact comprises steps of providing a plurality of superabrasive particles having a particle size distribution with a first ratio (d50)/(d50 principle particles) ranging from about 0.86 to about 0.92; providing a support to the plurality of superabrasive particles; and subjecting the support and the plurality of superabrasive particles to conditions of an elevated temperature and pressure suitable for producing the polycrystalline superabrasive compact.

17 Claims, 3 Drawing Sheets

|  | Formula | Interpretation | Preferred Range |
|---|---|---|---|
| 1st Metric | d50 divided by D50 Principle | Measure of the shift in d50 due to the addition of fines to the principle distribution | 0.86-0.92 |
| 2nd Metric | Percent of the Volume greater than 0.5*d50 | Percent of the Volume greater than 0.5*d50 | 86-90 |
| 3rd Metric | Percent of the Volume less than 0.25*d50 | Percent of the Volume less than 0.25*d50 | 7.5-9.4 |
| 4th Metric | Volume between d50 and 0.5xd50 divided by the volume greater than d50 | Volume of the distribution in region B divided by the volume of the distribution in region A | 0.73-0.78 |
| 5th Metric | Volume between 0.25xd50 and 0.5xd50 divided by the volume between 0.25xd50 and d50 | Volume of the distribution in region C divided by the sum of the volumes in regions C and B | 0.08-0.11 |
| 6th Metric | Volume between 0.11xd50 and 0.25xd50 divided by the volume less than 0.25xd50 | Volume of the distribution in region D divided by the sum of the volumes in regions D and E | 0.46-0.58 |

FIG. 5

DENSE PACKING PARTICLE SIZE DISTRIBUTION FOR PDC CUTTERS

CROSS-REFERENCE TO RELATED APPLICATIONS

The present application claims the benefit of U.S. Provisional Application No. 62/071,303, filed Jun. 26, 2014, the entire disclosure of which is hereby incorporated by reference.

TECHNICAL FIELD AND INDUSTRIAL APPLICABILITY

The present disclosure relates generally to superabrasive materials, such as polycrystalline diamond or cubic boron nitride and a method of making such superabrasive materials, and more particularly to dense packing such superabrasive particles for cutters.

SUMMARY

In one embodiment, a method of making a superabrasive compact, representing a superabrasive body bonded to a substrate, may comprise steps of providing a plurality of superabrasive particles having a particle size distribution with a first metric (d50)/(d50 principle particles) ranging from about 0.86 to about 0.92; providing a support to the plurality of superabrasive particles; and subjecting the support and the plurality of superabrasive particles to conditions of an elevated temperature and pressure suitable for producing the polycrystalline superabrasive compact.

In another embodiment, a method of making a polycrystalline diamond compact comprises steps of providing a plurality of superabrasive particles having a continuous particle size distribution with d50 ranging from about 12 microns to about 30 microns and having a long tail of fine superabrasive particles around about 1 micron to about 9 microns; providing a support to the plurality of superabrasive particles; and subjecting the support and the plurality of superabrasive particles to conditions of an elevated temperature and pressure suitable for producing the polycrystalline superabrasive compact.

In yet another embodiment, a method of making a polycrystalline diamond compact, may comprise steps of providing a plurality of superabrasive particles having a particle size distribution with a first metric (d50)/(d50 principle particles) ranging from about 0.86 to about 0.92, a second metric defined as the percent of the total volume of the distribution which is greater than 0.5 times d50 ranging from about 86 to about 90; and subjecting the plurality of superabrasive particles to conditions of an elevated temperature and pressure suitable for producing the polycrystalline superabrasive compact.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

FIG. 5 is a table illustrating a formula and an interpretation of the formula according to an embodiment.

DETAILED DESCRIPTION

Figure 1:
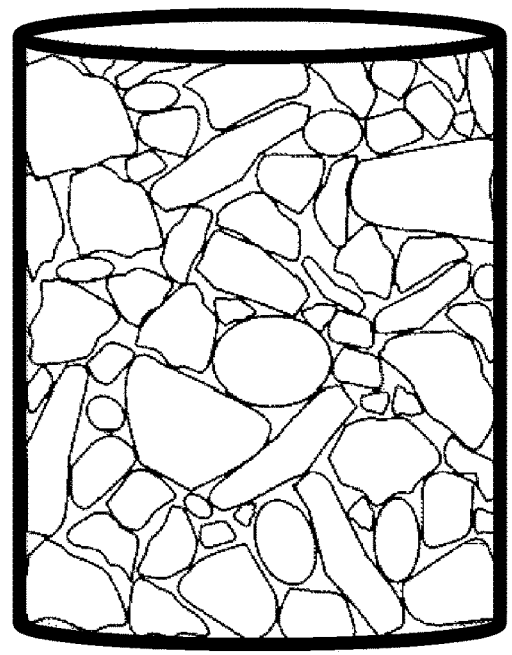
FIG. 1 is a schematic perspective view of a plurality of coarse superabrasive particles packed under high pressure.

Polycrystalline superabrasive compacts are used across a variety of industries, including being used in material removal processes. The usable live of the superabrasive compact may be influence by a variety of factors, including properties of the superabrasive compact such as impact resistance, resistance to abrasive wear, and thermal stability. The properties may be influenced by, among other factors, the particle size distribution of the particles that are sintered to one another to form the superabrasive compact. The particle size distribution may be selected to produce a superabrasive compact that has an appropriate balance of each of the properties. In one embodiment, a method of making a superabrasive compact may include a plurality of superabrasive particles having a particle size distribution d50 divided by a d50 of the principle particles of the largest population of particles ranging from about 0.86 to about 0.92. In another embodiment, a superabrasive compact may be made from superabrasive particles having a broad fine particle distribution with mean particle size d50 ranging from about 12 microns to about 30 microns and having an elongated tail of fine superabrasive particles ranging from about 1 micron to about 9 microns. In such embodiments, the particle distribution may allow for a more dense packing of the superabrasive particles as compared to the packing of conventional distributions of superabrasive particles. Dense packing of the superabrasive particles may limit the accumulation of large volumes of catalyst material by reducing the volume between the superabrasive particles. The resulting superabrasive compact that includes these populations of superabrasive particles may have desirable abrasive wear resistance provided by the elongated tail of relatively small sized superabrasive particles while maintaining high impact resistance provided by the relatively large sized superabrasive particles and good thermal stability by limiting the accumulation of large volumes of catalyst material. The combination of properties offered by the claimed particle populations may be unavailable from combinations of superabrasive particles having ordinary particle distribution profiles.

Before the description of the embodiment, terminology, methodology, systems, and materials are described; it is to be understood that this disclosure is not limited to the particular terminologies, methodologies, systems, and materials described, as these may vary. It is also to be understood that the terminology used in the description is for the purpose of describing the particular versions of embodiments only, and is not intended to limit the scope of embodiments. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients or properties, such as size, weight, reaction conditions and so, forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, "about 40%" means in the range of 36%-44%.

As used herein, the term "superabrasive particles" may refer to ultra-hard particles or superabrasive particles having a Knoop hardness of 3500 KHN or greater. The superabrasive particles may include diamond and cubic boron nitride, for example. The term "abrasive", as used herein, refers to any material used to wear away softer materials.

The term "particle" or "particles", as used herein, refers to a discrete body or bodies. A particle is also considered a crystal or a grain.

The term "principle particle" refers to the largest volume fraction of particles that are present in a mixture of particles that have a plurality of populations of particle sizes. For example, if a mixture of particles includes four populations of particle sizes (i.e., a "multimodal particle distribution") where each population has an approximately normal distribution, the particle sizes with the highest volume fraction within that mixture are referred to as the principle particles.

The term "superabrasive compact", as used herein, refers to a sintered product made using super abrasive particles, such as diamond feed or cubic boron nitride particles. The compact may include a support, such as a tungsten carbide support, or may not include a support. The "superabrasive compact" is a broad term, which may include cutting element, cutters, or polycrystalline diamond or cubic boron nitride insert.

The term "cutting element", as used herein, means and includes any element of an earth-boring tool that is used to cut or otherwise disintegrate earth formation material when the earth-boring tool is used to form or enlarge a bore in the formation.

The term "earth-boring tool", as used herein, means and includes any tool used to remove earth formation material and form a bore (e.g., a wellbore) through the formation by way of removing the earth formation material. Earth-boring tools include, for example, rotary drill bits (e.g., fixed-compact or "drag" bits and roller cone or "rock" bits), hybrid bits including both fixed compacts and roller elements, coring bits, percussion bits, bi-center bits, reamers (including expandable reamers and fixed-wing reamers), and other so-called "hole-opening" tools.

The term "feed" or "diamond feed", as used herein, refers to any type of diamond particles, or diamond powder, used as a starting material in further synthesis of PDC cutters.

The term "the mean particle size d50", as used herein, refers to a particle size corresponding to 50% of the volume of the sampled particles being greater than and 50% of the volume of the sampled particles being smaller than the recited d50 value. The term "d50 principle particles", as used herein, refers to a particle size of the largest volume fraction of particles that are introduced to a mixture and evaluated as the particle size where 50% of the volume of principle particles, before mixing, are greater than and 50% of the volume of principle particles, before mixing, are smaller than the recited d50 value. Similarly, the term "d90" refers to a particle size corresponding to 90% of the volume of the sampled particles being smaller than and 10% of the volume of the sampled particles being smaller than the recited d90 value. The term "d10" refers to a particle size corresponding to 10% of the volume of the sampled particles being smaller than and 90% of the volume of the sampled particles being smaller than the recited d10 value.

The term "d100", as used herein, refers to a particle size corresponding to 100% of the volume of the particles being smaller than the value d100. The term "d0", as used herein, refers to a particle size corresponding to 100% of the volume of the particles being larger than the value d0.

The term "a particle size distribution", as used herein, may be used to measure how a material particle size is distributed. The breadth of a particle size distribution may be characterized using not only a mean particle size d50 and a breadth of a particle size distribution. It is usual to form a quotient or a ratio, which is referred to as the span, and is calculated in accordance with the following formula: span=d90-d10/d50. The relationship is thus: the smaller the span, the narrower the particle size distribution. A powder comprising particles that are identical in size may have a span of 0.

The term "superabrasive", as used herein, refers to an abrasive possessing superior hardness and abrasion resistance. Diamond and cubic boron nitride are examples of superabrasives and have Knoop indentation hardness values of over 3500.

The terms "diamond particle" or "particles" or "diamond powder", which is a plurality of single crystals or polycrystalline diamond particles, are used synonymously in the instant application and have the same meaning as "particle" defined above.

Polycrystalline diamond (or "PCD", as used hereinafter) compact (or composite) may represent a volume of crystalline diamond grains with embedded foreign material filling the inter-grain space. In one particular case, a PCD composite comprises crystalline diamond grains, bound to each other by strong diamond-to-diamond bonds and form a rigid polycrystalline diamond body, and the inter-grain regions, disposed between the bounded grains are filled in one part with a catalyst material (e.g. cobalt or its alloys), which was used to promote diamond-to-diamond bonding during fabrication, and other part filled in other materials, which may remain after the sintering of diamond compact. Suitable metal solvent catalysts may include the iron group transitional metal in Group VIII of the Periodic table.

In another particular case, PCD composite comprises a plurality of crystalline diamond grains, which are not bonded to each other, but instead are bound together by foreign binding material such as carbides, borides, nitrides, and others, e.g. by silicon carbide bonded diamond material. PCD cutting element comprises a body of abovementioned polycrystalline diamond composite attached to a suitable substrate, e.g. cobalt cemented tungsten carbide (WC—Co). The feature enables PCD composite materials to be used in the form of wear or cutting element that may be attached to wear and/or cutting, such as subterranean drill bits, by conventional attachment means, such as by brazing and the like.

"Thermally stable material", as is understood commonly, refers to a material able to withstand the cutting conditions resulting in a high temperature of the cutting edge, thus resulting in a lower cutter wear. "Thermally stable polycrystalline diamond," as used herein, refers to PCD able to withstand the cutting conditions resulting in a high temperature of the cutting edge, thus resulting in a lower cutter wear.

"Broad fine particle distribution," used hereinafter, refers to a distribution of particles essentially finer than the principle distribution and which is characterized by an extended range of sizes over which the volume percent by size changes very little and such that peaks in the distribution are not identifiable or are poorly defined.

The presence of catalyst binder material inside the polycrystalline diamond body promotes the degradation of the cutting edge of the compact, especially if the edge temperature reaches a high enough critical value. It is theorized that the cobalt (or other transition metal catalyst) driven degradation may be caused by the large difference in coefficient of thermal expansion between diamond and catalyst, and also by the catalytic effect of cobalt on diamond graphitization. Therefore, the less metal catalyst content in the superabrasive compact, such as diamond body, the better thermal stability of the superabrasive compact.

Depletion of catalyst from the polycrystalline diamond body, for example, by chemical leaching in acids, leaves an interconnected network of pores and up to about 10 vol % residual catalyst, trapped inside the polycrystalline diamond body. It has been demonstrated that depletion of cobalt from the polycrystalline diamond body may significantly improve an abrasion resistance of PDC cutter. Thus, a thicker cobalt depleted layer near the cutting edge, such as more than about 100 μm, may provide better abrasion resistance of the PDC cutter than a thinner cobalt depleted layer, such as less than about 100 μm.

Polycrystalline diamond cutting element may be fabricated in different ways and the examples discussed herein do not limit a variety of different types of diamond composites and PDC cutters, which may be produced according to an embodiment. In one particular example, polycrystalline cutting element may be formed by placing a mixture of diamond powder with a suitable solvent catalyst material (e.g. cobalt powder) on the top of WC—Co substrate, the assembly is then subjected to conditions of HPHT process, where the solvent catalyst promotes desired inter-crystalline diamond-to-diamond bonding resulted in the formation of a rigid polycrystalline diamond body and, also, provides a binding between polycrystalline diamond body and WC—Co substrate.

In another particular example, a polycrystalline diamond cutting element is formed by placing diamond powder without a catalyst material on the top of a substrate containing a catalyst material (e.g. WC—Co substrate). In this example, necessary cobalt catalyst material is supplied from the substrate and melted cobalt is swept through the diamond powder during the HPHT process. In still another example, a hard polycrystalline diamond composite is fabricated by forming a mixture of diamond powder with silicon powder, and the mixture is subjected to an HPHT process, thus forming a dense polycrystalline compact where diamond particles are bound together by newly formed silicon carbide material.

Coarse superabrasive particles, may be packed under high pressure (normally more than about 45 kba to about 55 kbar), as shown FIG. 1. Even under high pressure, superabrasive particles may be resistant to deform. Some of the superabrasive particles may chip off corners, edges, etc. during the high pressure packing procedure, but the compressed particles according to conventional embodiments still have relatively large spaces between the individual suparabrasive particles. During the high pressure high temperature (HPHT) process, metal catalyst may sweep from the substrate into the superabrasive particles and fill into the large spaces between superabrasive particles. Therefore, after HPHT, the superabrasive body may contain substantially high metal catalyst, such as cobalt. Because metal catalyst has a much higher coefficient of thermal expansion (CTE) than superabrasive particles, such as polycrystalline diamonds, polycrystalline cubic boron nitrides, or diamond composite, the sintered superabrasive body may not be thermally stable.

Figure 2:
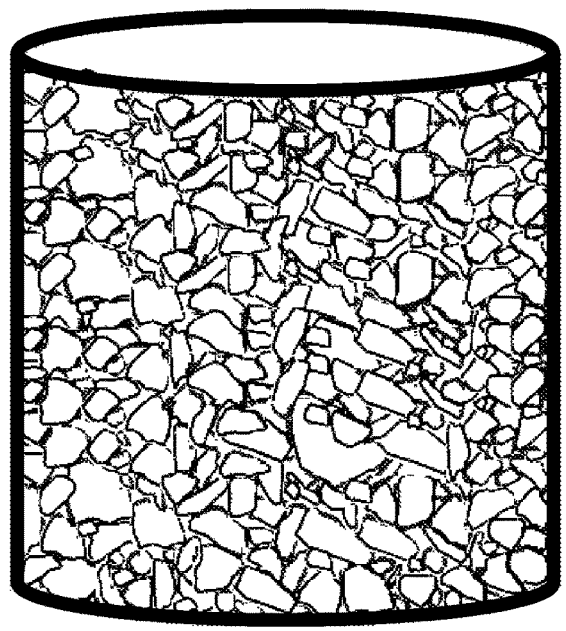
FIG. 2 is a schematic perspective view of a plurality of fine superabrasive particles packed under high pressure.

FIG. 2 shows fine superabrasive particles packed under high pressure. Compared to FIG. 1, fine superabrasive particles may have less space between particles than the coarse superabrasive particles. After the HPHT process, the fine superabrasive sintered body may contain more metal catalyst than the coarse superabrasive sintered body. Because the fine superabrasive sintered body has more metal catalyst, it may have reduced thermal stability, but improved resistance to abrasive wear. However, the fine superabrasive sintered body made of a majority of fine superabrasive particles may also have less impact resistance property than the coarse superabrasive sintered body. Therefore, to obtain all three properties of high impact resistance, high resistance to abrasive wear, and high thermal stability, it may be important to have a mixture of coarse and fine superabrasive particles as a feed or starting material that is processed into the polycrystalline body.

Figure 3:
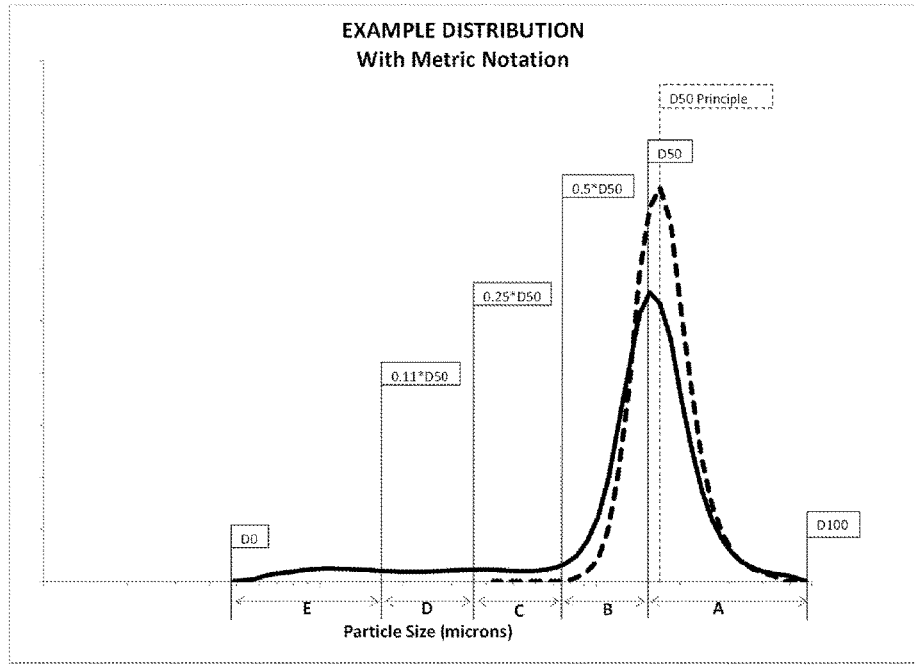
FIG. 3 is a graph illustrating differential of volume of any given particle size as a function of particle size.

FIG. 3 shows a particle distribution of a mixture of fine particles and coarse particles. A majority of particles may be coarse particles, with an elongated "tail" of fine superabrasive particles ranging from about 1 micron to about 9 microns. FIG. 3 illustrates a graph of the differential of volume of any given particle size as a function of particle size. This may be a log-normal plot where the particle size is plotted on a logarithmic scale. In effect, this curve may represent a graph of total volume of particles below a given size as a function of size.

Seven different populations having different particle size distributions may be employed to make up the mixture. A majority portion of principle particles may have an average particle size of about 19 microns (d50 principle distribution=19 microns). Another portion of particles may have an average particle size of about 12 microns. The third portion of the particles may have an average particle size of about 9.4 microns. The fourth portion of the particles may have an average particle size of about 6.3 microns. The fifth portion of the particles may have an average particle size of about 3.5 microns. The sixth portion of the particles may have an average particle size of about 2.5 microns. The seventh portion of the particles may have an average particle size of about 1.1 microns.

Each of the average size ranges of superabrasive powder used to make the mixture shown in FIG. 3 may comprise a mix of populations of particles having the stated average size, with actual particle sizes in a bell-shaped distribution around the average. The mixture may have a particle size distribution as illustrated in FIG. 3 before undergoing high pressure crushing. D50 volume of the mixture may be around 14.73 microns. In other words, 50% of the volume of superabarsive particles may be represented by particles up to 14.73 microns in "diameter".

FIG. 3 may further illustrate the plurality of particles having a particle size distribution with a first metric (d50)/(d50 principle particles) ranging from about 0.86 to about 0.92. The first metric may be used to measure a shift of d50 from the principle particles to the d50 after mixing with additional fine particles to the principle distribution. The particle size distribution may have a second metric the percent of the volume of crystals greater than 0.5 times the d50, wherein the second metric may be from about 86 to about 90. The second metric may be illustrated in FIG. 3 as the volume of the distribution in region A, expressed as a volume percent of the total volume distribution The particle size distribution may have a third metric defined as the percent of the volume of crystals less than 0.25 times d50 wherein the third metric may be from about 7.5 to about 9.4. The third metric may be illustrated in FIG. 3 as the sum of volumes of regions D and E of the distribution, expressed as a volume percent of the total distribution. The particle size distribution may have a fourth metric defined as the volume of the distribution between d50 and 0.5 times d50 divided by the volume greater than d50, wherein the fourth metric may be from about 0.73 to about 0.78. The fourth metric may be illustrated in FIG. 3 as the volume of region B of the distribution divided by the volume of region A of the distribution, expressed as a ratio. The particle size distribution has a fifth metric defined as the volume of the distribution between 0.25 times d50 and 0.5 times d50 divided by the volume between 0.25 times d50 and d50, wherein the fifth metric may be from about 0.08 to about 0.11. The fifth metric may be illustrated in FIG. 3 as the volume of region C of the distribution divided by the sum of the volumes in regions C and B, expressed as a ratio. The particle size distribution may have a sixth metric defined as the volume of the distribution between 0.11 times d50 and 0.25 times d50 divided by the volume less than 0.25 times d50, wherein the sixth metric may be from about 0.46 to about 0.58. The sixth metric may be illustrated in FIG. 3 as the volume of region D of the distribution divided by the sum of the volumes in regions D and E, expressed as a ratio.

Although seven different populations of particle sizes may be employed to make up the original mixture, which has been described as shown in FIG. 3, three different populations of particle sizes, or four, or five different populations of superabrasive particle distributions may be utilized to achieve similar results. For example, in one embodiment, the mean particle size d50 may range from about 12 microns to about 60 microns. In another embodiment, the mean particle size d50 ranges from about 12 microns to about 30 microns.

After high pressure crushing, prior to HPHT sintering, the original peak, as shown in FIG. 3, of particle size distribution is essentially shifted to a smaller size. This may indicate there is some particle cleavage. In addition, there is an increase in the proportion of fine superabrasive particles, indicating that corners and edges of the superabrasive particles may have been broken off of the larger particles and the larger particles may thereby be either more rounded or cleaved. This may be confirmed by microscopic examination.

Figure 4:
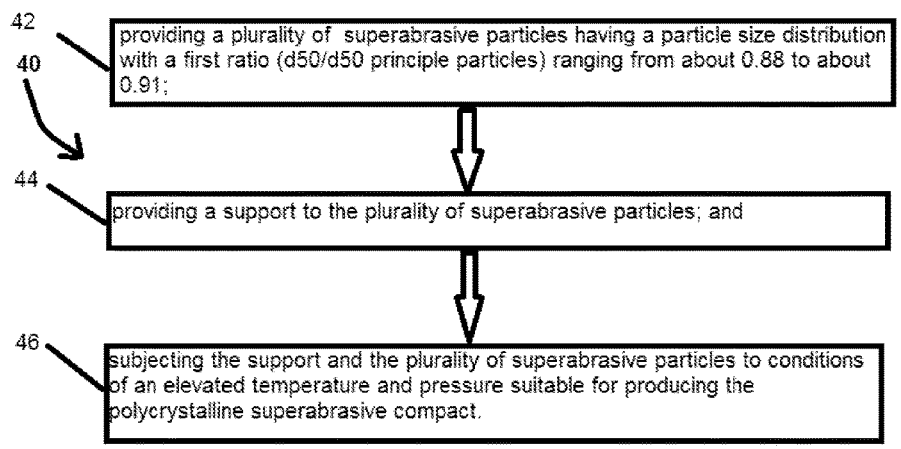
FIG. 4 is a flow chart illustrating a method of making a superabrasive compact.

As shown in FIG. 4, a method 40 of making a superabrasive compact may comprise steps of providing a plurality of superabrasive particles, such as diamonds, cubic boron nitride, or diamond composite materials, having a particle size distribution with a first metric (d50)/(d50 principle particles) ranging from about 0.86 to about 0.92 in a step 42; providing a support, such as cemented tungsten carbide, to the plurality of superabrasive particles in a step 44; and subjecting the support and the plurality of superabrasive particles to conditions of an elevated temperature and pressure suitable for producing the polycrystalline superabrasive compact in a step 46.

As shown in FIG. 5, a plurality of superabrasive particles may have a particle size distribution with a second metric, wherein the second metric is from about 86 to about 90. The second metric measures percentage of the volume greater than 0.5×d50. The particle size distribution may have a third metric, wherein the third metric is from about 7.5 to about 9.4. The third metric measures percentage of the volume less than 0.25×d50. The particle size distribution may have a fourth metric, wherein the fourth metric is from about 0.73 to about 0.78. The fourth metric may measure the volume of the distribution in region B divided by the volume of the distribution in region A (as shown in FIG. 3). The particle size distribution may have a fifth metric, wherein the fifth metric is from about 0.08 to about 0.11. The fifth metric may measure volume of the distribution in region C divided by the sum of the volumes in regions C and B (as shown in FIG. 3). The particle size distribution may have a sixth metric, wherein the sixth metric is from about 0.46 to about 0.58. The sixth metric may measure volume of the distribution in region D divided by the sum of the volumes in regions D and E (as shown in FIG. 3).

The superabrasive compact may be fabricated according to processes known to persons having ordinary skill in the art. Methods for making diamond compacts and composite compacts may be more fully described in U.S. Pat. Nos. 3,141,746; 3,745,623; 3,609,818; 3,850,591; 4,394,170; 4,403,015; 4,794,326; and 4,954,139.

When sintering superabrasive particles, such as diamond crystals of different sizes to form polycrystalline diamond, the thermodynamic driving force may be essentially a reduction in surface energy of the mixture. This may be achieved through dissolution of carbon atoms at the high energy points of contact between diamond grains under high pressure followed by precipitation at lower energy sites. This may also be achieved through dissolution of small particles of diamond, which have higher surface energy per unit volume than the larger crystals, and then precipitating carbon in the form of diamond on the larger crystals. Small particles may continue to dissolve and their carbon atoms migrate toward larger grains because the chemical potential of carbon atoms on a diamond grain is a function of the radius of the grain. The smaller the radius of the particle, the larger the chemical potential of surface carbon atoms on that grain.

Conversely, a larger grain having a flat surface may have minimum chemical potential of carbon atoms because the radius is equal to or approaches infinity. Concentration of carbon atoms onto larger crystals from smaller particles reduces the total energy of the system towards a minimum. Under an HPHT process, a particle size distribution starting with a higher packing density of component particles may, in turn, result in lower metal catalyst content as compared to a starting distribution that has a lower packing density.

One or more steps may be inserted in between or substituted for each of the foregoing steps 42-46 without departing from the scope of this disclosure.

Lists of itemized embodiments:

1. A method of making a superabrasive compact, comprising:

providing a plurality of superabrasive particles having a particle size distribution with a first metric (d50)/(d50 principle particles) ranging from about 0.86 to about 0.92;

providing a support to the plurality of superabrasive particles; and subjecting the support and the plurality of superabrasive particles to conditions of an elevated temperature and pressure suitable for producing the polycrystalline superabrasive compact.

2. The method of item 1, wherein the particle size distribution has a second metric defined as percentage of volume of crystals greater than (0.5 times d50), wherein the second metric is from 86 to 90.

3. The method of item 2, wherein the particle size distribution has a third metric defined as percentage of volume less than (0.25 times d50), wherein the third metric is from 7.5 to 9.4.

4. The method of item 3, wherein the particle size distribution has a fourth metric defined as the volume of the distribution between d50 and (0.5 times d50) divided by the volume greater than d50, wherein the fourth metric is from 0.73 to 0.78.

5. The method of item 4, wherein the particle size distribution has a fifth metric defined as the volume of the distribution between (0.25 times d50) and (0.5 times d50) divided by the volume between (0.25 times d50) and d50, wherein the fifth metric is from 0.08 to 0.11.

6. The method of item 1, wherein the mean particle size d50 ranges from 12 microns to 60 microns.

7. The method of item 5, wherein the particle size distribution has a sixth metric defined as the volume of the distribution between (0.11 times d50) and (0.25 times d50) divided by the volume less than (0.25 times d50), wherein the sixth metric is from 0.46 to 0.58.

8. The method of item 1, wherein the superabrasive particles are selective from a group consisting of cubic boron nitride, diamond, and diamond composite materials.

9. A method of making a superabrasive compact, comprising:
providing a plurality of superabrasive particles having a broad fine particle distribution with mean particle size d50 ranging from 12 microns to 30 microns and having an elongated tail of fine superabrasive particles ranging from 1 micron to 9 microns;
providing a support to the plurality of superabrasive particles; and
subjecting the support and the plurality of superabrasive particles to conditions of an elevated temperature and pressure suitable for producing the polycrystalline superabrasive compact.

10. The method of item 9, wherein the superabrasive particles are selective from a group consisting cubic boron nitride, diamond, and diamond composite materials.

11. The method of item 9, wherein the support is cemented tungsten carbide support.

12. The method of item 9, wherein the particle size distribution has a first metric (d50)/(d50 principle particles), wherein the first metric is from 0.86 to 0.92.

13. The method of item 9, wherein the particle size distribution has a second metric defined as percentage of volume of crystals greater than (0.5 times d50), wherein the second metric is from 86 to 90.

14. The method of item 9, wherein the particle size distribution has a third metric defined as percentage of volume less than (0.25 times d50), wherein the third metric is from 7.5 to 9.4.

15. The method of item 9, wherein the particle size distribution has a fourth metric defined as the volume of the distribution between d50 and (0.5 times d50) divided by the volume greater than d50, wherein the fourth metric is from 0.73 to 0.78.

16. The method of item 9, wherein the particle size distribution has a fifth metric defined as the volume of the distribution between (0.25 times d50) and (0.5 times d50) divided by the volume between (0.25 times d50) and d50, wherein the fifth metric is from 0.08 to 0.11.

17. The method of item 12, wherein the particle size distribution has a sixth metric defined as the volume of the distribution between (0.11 times d50) and (0.25 times d50) divided by the volume less than (0.25 times d50), wherein the sixth metric is from 0.46 to 0.58.

18. A method of making a superabrasive compact, comprising:
providing a plurality of superabrasive particles having a particle size distribution with a first metric (d50)/(d50 principle particles) ranging from 0.86 to 0.92, a second metric defined as percentage of a total volume of the distribution that is greater than (0.5 times d50) ranging from 86 to 90; and
subjecting the plurality of superabrasive particles to conditions of an elevated temperature and pressure suitable for producing the polycrystalline superabrasive compact.

19. The method of item 18, further comprising providing a support to the plurality of superabrasive particles and subjecting the support together with the plurality of superabrasive particles to conditions of an elevated temperature and pressure suitable for producing the polycrystalline superabrasive compact.

20. The method of item 18, wherein the particle size distribution has a third metric defined as percentage of volume less than (0.25 times d50), wherein the third metric is from 7.5 to 9.4.

21. The method of item 20, wherein the particle size distribution has a fourth metric defined as the volume of the distribution between d50 and (0.5 times d50) divided by the volume greater than d50, wherein the fourth metric is from 0.73 to 0.78.

22. The method of item 21, wherein the particle size distribution has a fifth metric defined as the volume of the distribution between (0.25 times d50) and (0.5 times d50) divided by the volume between (0.25 times d50) and d50, wherein the fifth metric is from 0.08 to 0.11.

23. The method of item 22, wherein the mean particle size d50 ranges from 12 microns to 60 microns.

24. The method of item 23, wherein the particle size distribution has a sixth metric defined as the volume of the distribution between (0.11 times d50) and (0.25 times d50) divided by the volume less than (0.25 times d50), wherein the sixth metric is from 0.46 to 0.58.

25. The method of item 18, wherein the superabrasive particles are selective from a group consisting cubic boron nitride, diamond, and diamond composite materials.

While the reference has been made to specific embodiments, it is apparent that other embodiments and variations can be devised by others skilled in the art without departing from their spirit and scope of this disclosure. The appended claims are intended to be construed to include all such embodiments and equivalent variations.

The invention claimed is:

1. A method of making a superabrasive compact, comprising:
calculating a first metric value measuring a shift in the mean of a principle particle statistical distribution after mixing the principle particles with additional fine particles, the first metric value calculated as (d50)/(d50 principle particles) and equal to the mean of the distribution of a combination of principle particles mixed with additional fine particles (d50), divided by the mean of a distribution of principle particles (d50 principle particles), wherein the particles larger than d50 comprise a volume area A;

providing a support to the plurality of superabrasive particles; and subjecting the support and the plurality of superabrasive particles to conditions of an elevated temperature and pressure suitable for producing the polycrystalline superabrasive compact, wherein the principle particles range in size from 1 micron to 100 microns.

2. The method of claim 1, wherein the particle size distribution supports a second metric calculated as equal to the product of 0.5 times d50 divided by the difference of d100 minus d0, wherein particles larger than 0.5 times d50 comprise an area A+B, wherein the plurality of superabrasive particles are selected from the principle particles having a second metric from about 0.86 to about 0.90.

3. The method of claim 2, wherein the particle size distribution supports a third metric calculated as equal to the product of 0.25 times d50 divided by the difference between d100 minus d0, wherein the particles smaller than 0.25 times d50 comprise area D plus E, wherein the plurality of superabrasive particles are selected from the principle particles having a third metric is from about 0.75 to about 0.94.

4. The method of claim 3, wherein the particle size distribution supports a fourth metric calculated as equal to the product of d50 minus 0.5 times d50 divided by the product of 0.5 times d50, wherein the particles which are both larger than 0.5 times d50 and smaller than d50 comprise area B, wherein the plurality of superabrasive particles are selected from the principle particles having a third metric is from about 0.73 to about 0.78.

5. The method of claim 4, wherein the particle size distribution has a fifth metric calculated as equal to the difference between the product of 0.5 times d50 minus the product of 0.25 times d50 divided by the difference between the product of 0.5 times d50 minus the product of 0.25 times d50, wherein the particles which are both smaller than 0.5 times d50 and larger than 0.26 times d50 comprise area C, wherein the fifth metric is from about 0.08 to about 0.11.

6. The method of claim 1, wherein the mean particle size d50 ranges from about 12 microns to about 60 microns.

7. The method of claim 5, wherein the particle size distribution has a sixth metric calculated as equal to the product of 0.25 times d50 minus the product of 0.11 times d50, divided by the product of 0.25 times d50, wherein the particles which are both smaller than 0.25 times d50 and larger than 0.11 times d50 comprise area D, wherein the sixth metric is from about 0.46 to about 0.58.

8. The method of claim 1, wherein the superabrasive particles are selected from a group consisting of cubic boron nitride, diamond, and diamond composite materials.

9. The method of claim 1, wherein the particle size distribution has a sixth metric calculated by and equal to multiplying 0.25 times d50 and subtracting 0.11 times d50, and then dividing this by the sum of 0.25 times d50 minus 0.11 times d50 plus 0.11 times d50, wherein the sixth metric is from about 0.46 to about 0.58.

10. A method of making a superabrasive compact, comprising:

providing a plurality of superabrasive particles having a particle size distribution with a first metric value calculated as (d50)/(d50 principle particles) and equal to the mean of the distribution of a combination of principle particles mixed with additional fine particles (d50), divided by the mean of a distribution of principle particles (d50 principle particles), wherein the particles larger than d50 comprise a volume area A, wherein the superabrasive particles are selected from the distribution with a first metric value ranging from about 0.86 to about 0.92, a second metric defined as percentage of a total volume of the distribution that is greater than (0.5 times d50) ranging from about 86 to about 90; and subjecting the plurality of superabrasive particles to conditions of an elevated temperature and pressure suitable for producing the polycrystalline superabrasive compact.

11. The method of claim 10, further comprising providing a support to the plurality of superabrasive particles and subjecting the support together with the plurality of superabrasive particles to conditions of an elevated temperature and pressure suitable for producing the polycrystalline superabrasive compact.

12. The method of claim 10, wherein the particle size distribution has a third metric calculated as (0.25 times d50) divided by the difference of d100 minus d0, wherein the third metric is from about 0.5% to about 9.4%.

13. The method of claim 12, wherein the particle size distribution has a fourth metric calculated as d50 minus (0.5 times d50) divided by d50, wherein the fourth metric is from about 0.73 to about 0.78.

14. The method of claim 13, wherein the particle size distribution has a fifth metric calculated as the difference between (0.25 times d50) and (0.5 times d50) divided by the difference between (0.25 times d50) and d50, wherein the fifth metric is from about 0.08 to about 0.11.

15. The method of claim 14, wherein the mean particle size d50 ranges from about 12 microns to about 60 microns.

16. The method of claim 15, wherein the particle size distribution has a sixth metric calculated as the difference between (0.11 times d50) and (0.25 times d50) divided by the volume less than (0.25 times d50), wherein the sixth metric is from about 0.46 to about 0.58.

17. The method of claim 10, wherein the superabrasive particles are selected from a group consisting of cubic boron nitride, diamond, and diamond composite materials.

* * * * *